US006409528B1

(12) United States Patent
Bodnar

(10) Patent No.: US 6,409,528 B1
(45) Date of Patent: Jun. 25, 2002

(54) DEVICE AND METHOD FOR COLLECTING, PREPARATION AND STABILIZING A SAMPLE

(75) Inventor: Kenneth J. Bodnar, Bethlehem, PA (US)

(73) Assignee: Becton, Dickinson and Company, Franklin Lakes, NJ (US)

( * ) Notice: Subject to any disclaimer, the term of this patent is extended or adjusted under 35 U.S.C. 154(b) by 0 days.

(21) Appl. No.: 09/560,061

(22) Filed: Apr. 27, 2000

Related U.S. Application Data

(60) Provisional application No. 60/169,166, filed on Dec. 6, 1999.

(51) Int. Cl.[7] .................................................. G01N 1/18

(52) U.S. Cl. .......................... 439/177; 436/178; 436/17; 422/72; 422/102; 435/306.1

(58) Field of Search ................................. 436/165–166, 436/177–178, 63, 69–71, 17–18; 422/61, 72, 73, 102, 101, 103; 435/306.1, 308.1, 304.1, 297.3

(56) References Cited

U.S. PATENT DOCUMENTS

| | | | | |
|---|---|---|---|---|
| 3,849,072 A | | 11/1974 | Ayres | |
| 4,083,788 A | | 4/1978 | Ferrara | |
| 4,088,582 A | | 5/1978 | Murty et al. | |
| 4,131,549 A | | 12/1978 | Ferrara | |
| 4,154,690 A | | 5/1979 | Ballies | |
| 4,257,886 A | * | 3/1981 | Kessler | 206/524.3 |
| 4,364,832 A | | 12/1982 | Ballies | |
| 4,443,345 A | | 4/1984 | Wells | |
| 4,818,386 A | | 4/1989 | Burns | |
| 4,877,520 A | | 10/1989 | Burns | |
| 5,269,927 A | | 12/1993 | Fiehler | |
| 5,455,009 A | | 10/1995 | Vogler et al. | |
| 5,575,778 A | | 11/1996 | Hardt et al. | |
| 5,632,905 A | | 5/1997 | Haynes | |

FOREIGN PATENT DOCUMENTS

| | | |
|---|---|---|
| EP | 0 017 127 | 3/1980 |
| EP | 0 627 261 A2 | 6/1994 |
| EP | 0 638 804 A1 | 8/1994 |
| JP | 6-222055 | 8/1994 |

* cited by examiner

*Primary Examiner*—Lyle A. Alexander
(74) *Attorney, Agent, or Firm*—Nanette S. Thomas

(57) ABSTRACT

An assembly device and method for collecting and testing fluid samples more specifically for preparing and stabilizing nucleic acid components in a closed system. The assembly comprises a sample collection container with preloaded testing reagents and a safety separator to contain the testing reagents during sample collection. A fluid sample is delivered to the container and the assembly is subjected to centrifugation whereby the centrifugal load causes the separator to deform so that the separator migrates through the test reagents mixing the sample and reagents, and comes to rest atop the solids at the bottom of the tube.

16 Claims, 10 Drawing Sheets

DEVICE AND METHOD FOR COLLECTING, PREPARATION AND STABILIZING A SAMPLE

This Appln claims benefit of Prov. No. 60/169,166 filed Dec. 6, 1999.

BACKGROUND OF THE INVENTION

1. Field of the Invention

This invention relates to sample collection tubes provided with a test fluid safety separator, permitting pre-loading of the tubes with potentially toxic testing reagents. More particularly, this invention relates to a closed system for the collection, preparation and stabilization of nucleic acid, comprising a separator device, and method for collecting and transporting fluid samples whereby the separator reduces back flow of potentially toxic testing solutions, reduces the opportunity for contamination and increases amount of target recovered.

2. Description of Related Art

In blood collection procedures, samples of whole blood are typically collected from a patient by venipuncture through a cannula or needle attached to a syringe or an evacuated collection tube. Typically, the samples are then shipped to a laboratory where personnel experienced in sample preparation add testing reagents such as a lysing solution, and then place the tube in a centrifuge so as to effect mixing of the blood sample with the reagent. Lysing solutions, or other testing reagents, are often toxic, and hence are not included in the sample collection tube because of the possibility of back flow into the veins of the patient during sample collection. Thus, typically, laboratory personnel open the collection tube to add the testing reagent to the collected specimen. This is time consuming and also increases the risk of sample contamination.

In another diagnostic area, a patient's whole blood sample maybe separated into two liquid phases, and separately maintain for subsequent examination of the individual components. A variety of separator devices have been used in collection devices to separate the heavier and lighter phases of a fluid sample.

However, to employ a separator device in an evacuated tube for the collection of fluid samples it is desirable that the separator device: (i) is easily and safely used for collecting samples; (ii) is independent of temperature during storage and shipping and stable to radiation sterilization; (iii) permits completion of nucleic acid preparation by centrifugation alone (with no additional step of introducing testing reagents); (iv) minimizes opportunity for cross contamination of samples from introduction of testing solutions before centrifugation; (v) increases the amount of target than can be recovered. Presently known separator devices do not meet all of these requirements.

SUMMARY OF THE INVENTION

The present invention comprises a closed system for the collection and testing of a fluid sample preferably a blood sample including the preparation and stabilization of nucleic acids. The system includes a method and an assembly for collection and testing. Preferably, the assembly comprises a container and a safety separator.

Most preferably, the container is a tube and the separator is arranged to move in the tube under the action of centrifugal force in order to release a testing solution up, into the fluid sample.

Most, preferably, the tube includes an open end, a closed end and a sidewall extending between the open end and closed end. The tube further includes a closure with a releasable self-sealing septum disposed to fit in the open end of the tube. A safety separator is positioned atop preloaded testing reagents in the bottom of the tube. Alternatively, both ends of the tube may be open, and both ends of the tube may be sealed by elastomeric closures. At least one of the closures of the tube may include a needle pierceable resealable septum.

In one preferred embodiment, the safety separator comprises a toroidal separator and in another preferred embodiment, a bellow separator.

Preferably, the safety separator includes an overall specific gravity greater than the specific gravity of the testing reagents (preloaded into the tube) or the mixture of testing reagents and the sample.

According to a desired method of the present invention, testing reagents are provided in a typical sample collection evacuated tube. Thereafter, a separator is placed in the tube, above the test reagents. The separator makes physical contact with the tube, presenting a barrier to back flow of the test reagents during sample collection. A resealable closure is placed in the end of the tube so as to create an evacuated space between the closure and the separator. A sample is collected in the evacuated space. Under centrifugal force, the separator is deformed and the barrier with the tube is broken. Because the separator's density is greater than that of the testing reagents, it begins to migrate toward the closed end of the tube, releasing testing solution to mix with the sample collected.

DETAILED DESCRIPTION

Figure 1:
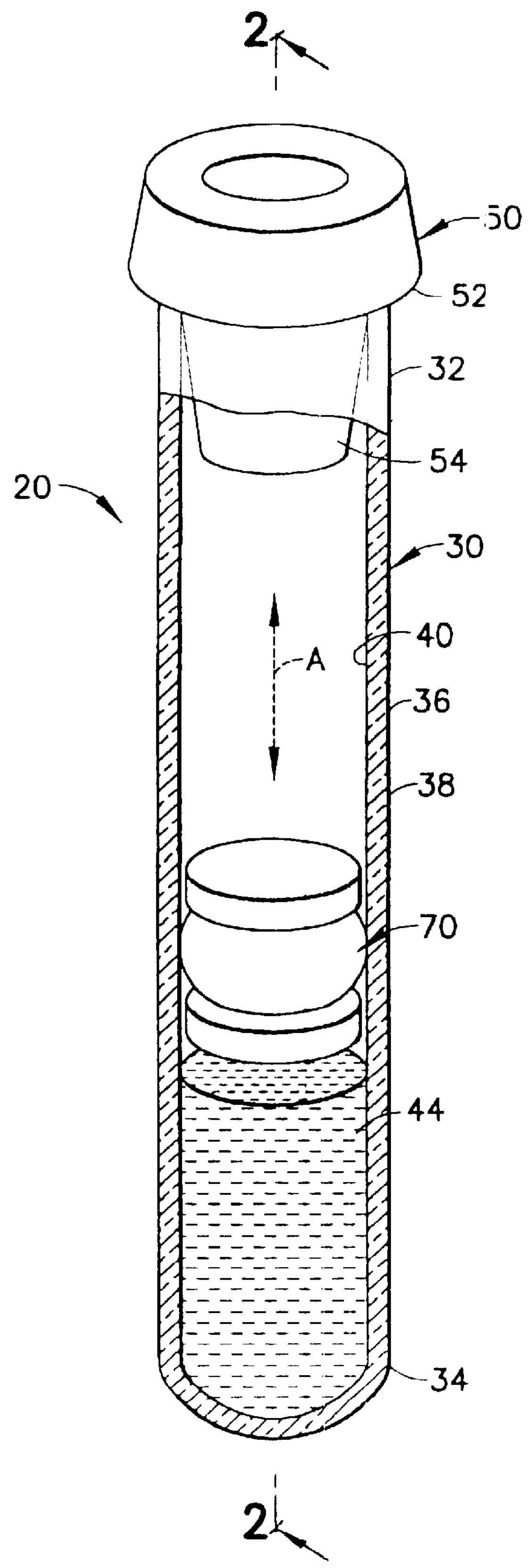
FIG. 1 is a perspective view of the assembly of the present invention.

The present invention provides a fluid collection assembly which allows for the safe and efficient testing of a collected fluid sample with a preloaded testing reagent. More specifically, the present invention provides a closed system which provides for collection as well as preparation and stabilization of nucleic acids.

The preferred assembly 20 of the present invention is illustrated in FIGS. 1 to 5, wherein the assembly comprises a tube, shown generally at 30, a closure shown generally at 50 and a separator 70.

Tube 30 has an open end 32 that includes a top edge 33, a closed end 34 and a sidewall 36 extending between the open end and the closed end. Sidewall 36 has an outer surface 38 and an inner surface 40. Tube 30 defines a receptacle with a central axis "A". Tube 30 is preferably made from a substantially transparent and rigid material. Suitable materials or the tube include glass, polystyrene, polyethyleneterephthalate, polycarbonate and the like.

Closure 50 is disposed to fit over open end 32 of tube 30. Closure 50 comprises and annular upper portion 52 which extends over top edge 33 of sidewall 36 and a lower annular portion or skirt 54 of lesser diameter than the annular upper portion 52 which extends into the forms an interference fit with inner surface 40 of sidewall 36 for maintaining stopper 50 in place in open end 32.

Annular upper portion 52 includes a top surface area 56, sidewall 58 that converges from surface area 56 towards upper well area 60. Well area 60 is most preferably a thin diaphragm or a self-sealing septum for directing and receiving the point of a needle to be inserted into and through the stopper.

Lower annular skirt portion 54 defines a lower well 62, an inner wall surface 64, an outer wall surface 66 and a bottom surface 68. Well area 60 and lower well area 62 define a thin diaphragm or self-sealing septum through which a needle may be inserted. The self-sealing septum material allows penetration by a piercing element such as a needle 16 and then reseals when the piercing element is withdrawn.

An annular ledge or abutment 57 separates annular upper portion 52 and lower annular portion 54. Preferably, the closure maybe made of natural rubber elastomer, synthetic thermoplastic and thermoset elastomeric materials. Preferably, the closure is made of a resilient elastomeric material whereby the septum is self-sealing.

As shown in FIGS. 1–5, the toroidal separator 70 includes an elastic toroid 72, a low-density foam float 90 and a high-density sinker 110. The components of the separator are formed from materials which exhibit a combined density greater than the density of the combined collected fluid sample and the preloaded testing reagents.

Toroid 72 includes a top section 86, a bottom section 88, and an elastic seal body 91 extending from the top section to the bottom section with a central passageway 98 extending between through the ends and the seal body.

Low-density foam float 90 is located at top section 86 and high-density sinker 110 is located at bottom section 88. High-density sinker 110 surrounds bottom section 88 without obstructing central passageway 98. Low density foam float 90 is at top section 86 and in direct alignment with central passageway 98.

Figure 5:
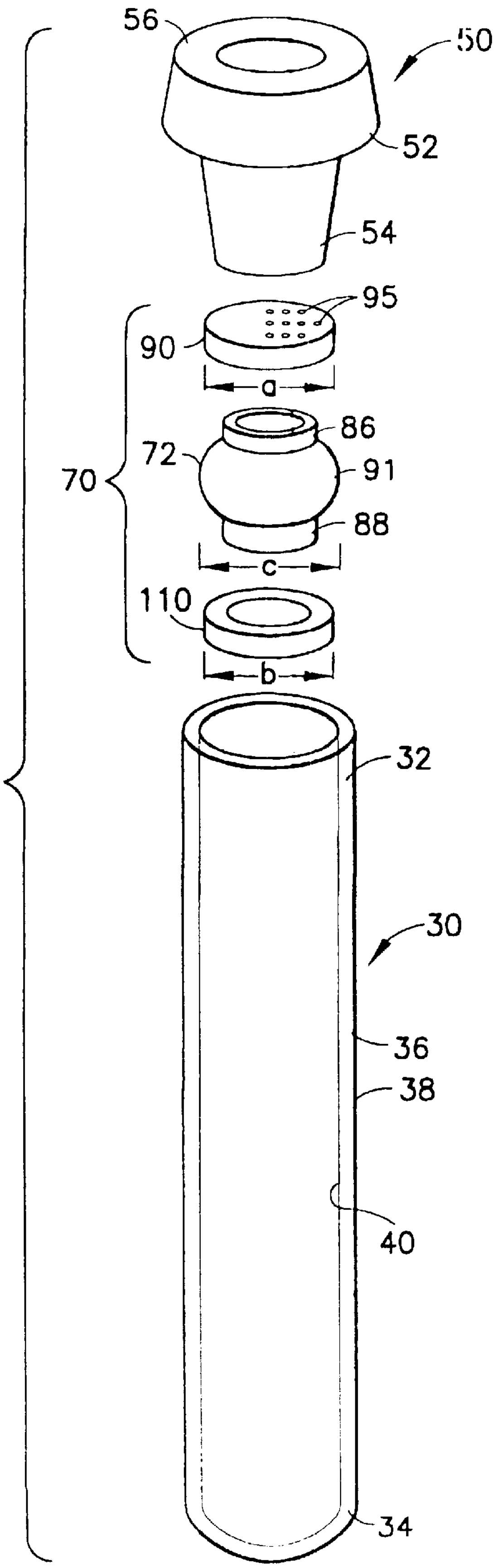
FIG. 5 is a perspective view of the unassembled elements of the assembly of the present invention.
Figure 6:
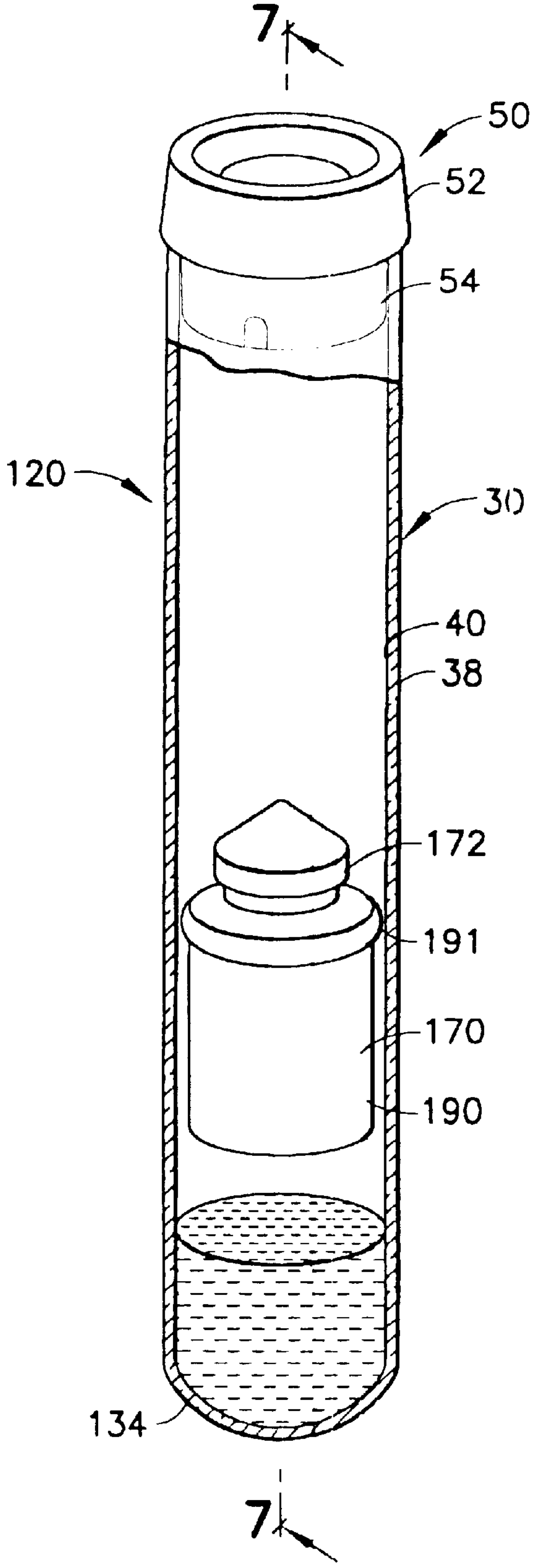
FIG. 6 is a perspective view of an alternate embodiment of the assembly of the present invention.

Low-density foam float 90 may comprise small holes 95 to bleed air out of central passageway 98 when in use. As shown in FIG. 5, the outside diameter "a" of top section 86 and the outside diameter "b" of bottom section 88 are less than the outside diameter "c" of the seal body when the seal body is in its undeformed position. Seal body 91 of toroid 72 and the inner wall of the tube form an interference fit. The low-density foam float and the high-density sinker do not interfere with the inner wall of the tube.

Toroid 72 may be assembled by mounting foam 90 over open top section 86 and sinker 110 around the outer circumference of open bottom end 88. Toroid is then inserted into open end of the tube. Sufficient insertion causes the seal body to sealingly engage the inner tube sidewall, and seal preloaded testing reagents 44, in the closed end of the tube. Thus, the separator 70 is positioned initially atop the testing reagents 44 and spaced from the closed end of the tube.

Figure 2:
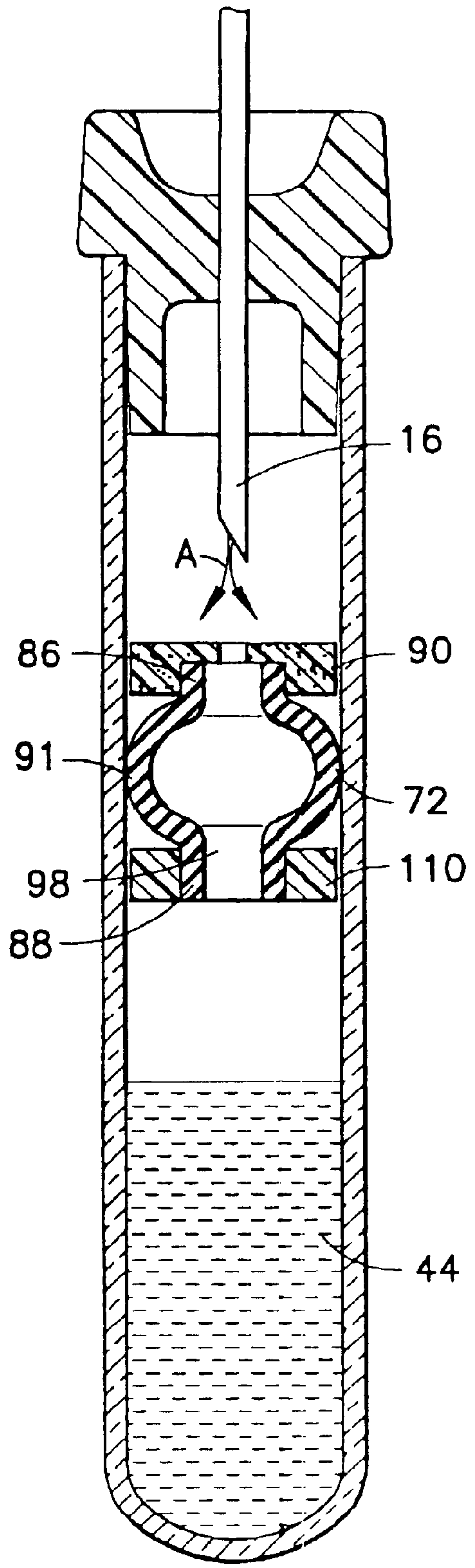
FIG. 2 is a longitudinal sectional view of the assembly of FIG. 1 taken along line 2—2 thereof illustrating fluid delivery into the assembly by a needle.

As shown in FIG. 2, in use, a liquid sample A is delivered to the tube by a needle that penetrates closure 50 in upper well area 60. For purposes of illustration only, the liquid sample is blood. The liquid sample is introduced into the evacuated space between the closure and the safety separator. The separator 70 effectively blocks movement of the testing reagent 44 into the evacuated space during blood collection. This prevents back flow of the reagents towards the patient. This feature allows blood collection and testing in a closed system, i.e., there is no need to open the tube to introduce the testing reagent after blood collection. The separator's position atop the testing reagents 44 preloaded in the bottom of the tube 30, and spaced from the closure, provides easy direct loading of the fluid sample on the separator. Thus, the fluid sample is easily delivered into the tube without exposing the fluid sample needle to the test reagents, reducing back flow to almost zero. After collection, the needle 16 is withdrawn from the tube 30 and the septum of the closure reseals itself.

Figure 3:
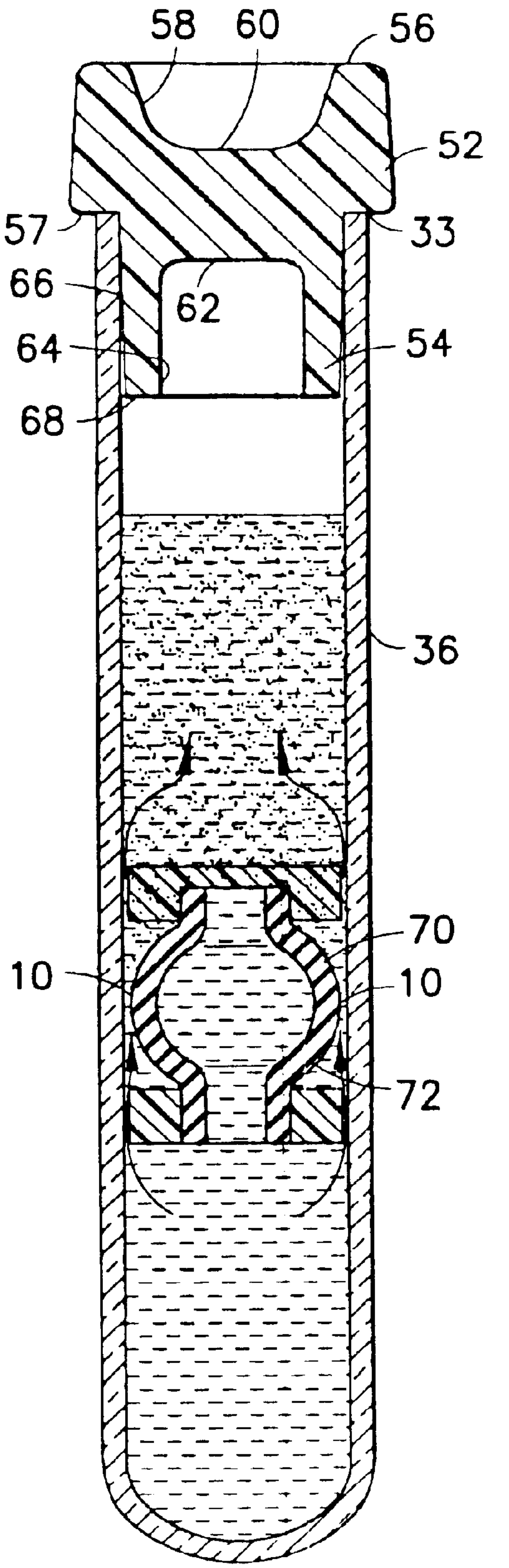
FIG. 3 illustrates that assembly under centrifugation and the movement of the separator, and flow of testing reagents into the sample.
Figure 4:
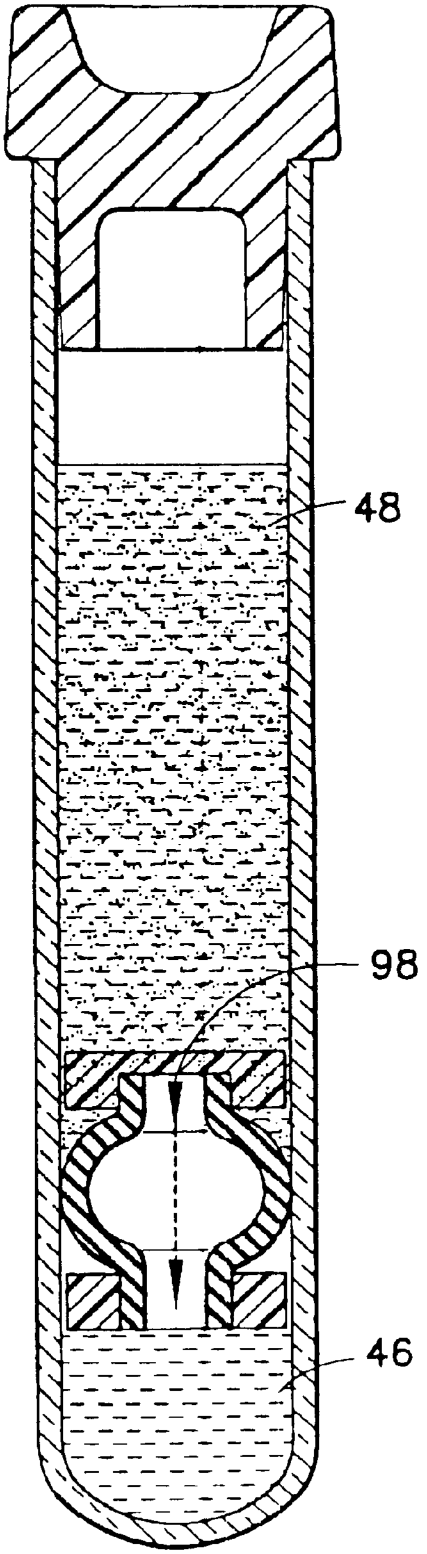
FIG. 4 illustrates the assembly after centrifugation and the preparation of the nucleic acid within the liquid sample.

As shown in FIG. 3, in order to effect testing, the assembly 20 is subjected to centrifugation or axial centrifugation force. Seal body 91 of separator 70 deflects, and is thereby released from the inner wall of the tube. The separator 70 descends towards closed end 34 of tube 30. As the separator descends, seal body 91 of the separator deflects reducing its diameter causing a stretching or elongation and eliminating its interference fit with the inner wall of the tube. The separator 70 is therefore forced to move axially within the tube without any frictional drag. This opens up a path 10 between the tube and the separator, permitting the flow of the testing reagents 44 upwardly past the separator as the separator 70 migrates down the tube. This causes mixing of the testing reagents with the sample so as to permit appropriate testing of the sample. Air will be trapped in the passageway when the bottom section of the toroid contacts the testing reagents. This trapped air could restrict further downward movement of the separator. However, the small holes in the foam defines a path through which trapped air may escape the passageway. Thus, separator 70 is permitted to sink into the closed end of the tube.

After centrifugation is terminated, the absence of the centrifugal load will cause the elastic toroid to resiliently return toward an expanded undeformed condition and tightly seal with the inner wall of the tube as shown in FIG. 5. Thus, separator 70 serves as a divider between the liquid components, 46 and any resultant residue 48 from the test procedure. In nucleic acid preparation for example, gene amplification testing (GAT) blood samples are treated with solutions such as lysing solutions, that break open the cells and release and stabilize the nucleic acid. Nucleic acids are a class of naturally occurring biochemical entities composed of sugar molecules, nitrogenous bases and phosphate groups. Ribonucleic acid (RNA) and deoxynucleic acid (DNA) are prime examples of nucleic acid and may be of viral or genomic origin. The nucleic acid is found in liquid component 46. Depending on the specific testing reagents, nucleic acid components may be in the liquid component, with the combined residual testing reagents and sera of the sample contained between the separator and the top of the tube, or may be included in the residue or sediment with the cell membrane, cytoplasm and proteins released in the lysing of the sample contained between the separator and the solution of the tube.

Tube 30 is compatible with most of the numerous additives used in sample collection tubes such as citrates, silicone, silicates, EDTA and the like that are used to condition the sample either to facilitate or retard clotting, or to preserve the sample for a particular analysis. It is within the purview of this invention that one or more additives may be used in the present invention for particular applications.

FIGS. 6–10 represent an alternative embodiment of the present invention. As illustrated in FIGS. 6–10, the alternative embodiment comprises assembly shown generally at 120, which comprises a tube 30, a closure 50 as described above, and a separator 170.

As shown in FIGS. 6–10, separator 170 comprises a bellow member 172, a low-density buoyance or float member 190 and a high-density sinker or ballast member 210. The components of the separator are formed from materials to exhibit a combined, but greater than the density of the collected fluid sample and the preloaded testing reagents.

Buoyance member 190 comprises a top section 211 bottom section 212 and a central passageway 214 extending continuously between the ends. Buoyance member 190 is preferably made of a material which has a component density having the capability to allow it to float in serum of a blood sample. In the present embodiment, buoyance member 190 may be formed of a low density foam.

Bellow member 172 comprises a rupturable elastomeric material such as Kraton copolymer, a urethane or PVC. Bellow member 172 includes a bottom 188, a top 186, a seal body 191 extending between the top and bottom. Bellow member 172 is made of a material and of a shape which allows deflections caused by opposing forces.

Ballast member 210 comprises a cylindrical sidewall 220 extending from a top end 221 to a bottom end 222 and a central passageway 223 extending between the top and bottom ends. The ballast member 210 has a component density whereby it has the capability of sinking in a blood sample. Preferably, the ballast member 210 is made of a high density material such as a substantially rigid moldable thermoplastic material. Such materials include but are not limited to polyvinyl chloride, polystyrene, polyethylene, polypropylene, polyester and mixtures thereof that are inert to the fluid sample of interest.

The separator is assembled whereby the bottom of bellow member 172 is inserted into the top end of ballast member 210 and then the bottom end of the ballast member is joined with top section 211 of the buoyance member whereby the top section is within central passageway 223 of the ballast member.

Figure 7:
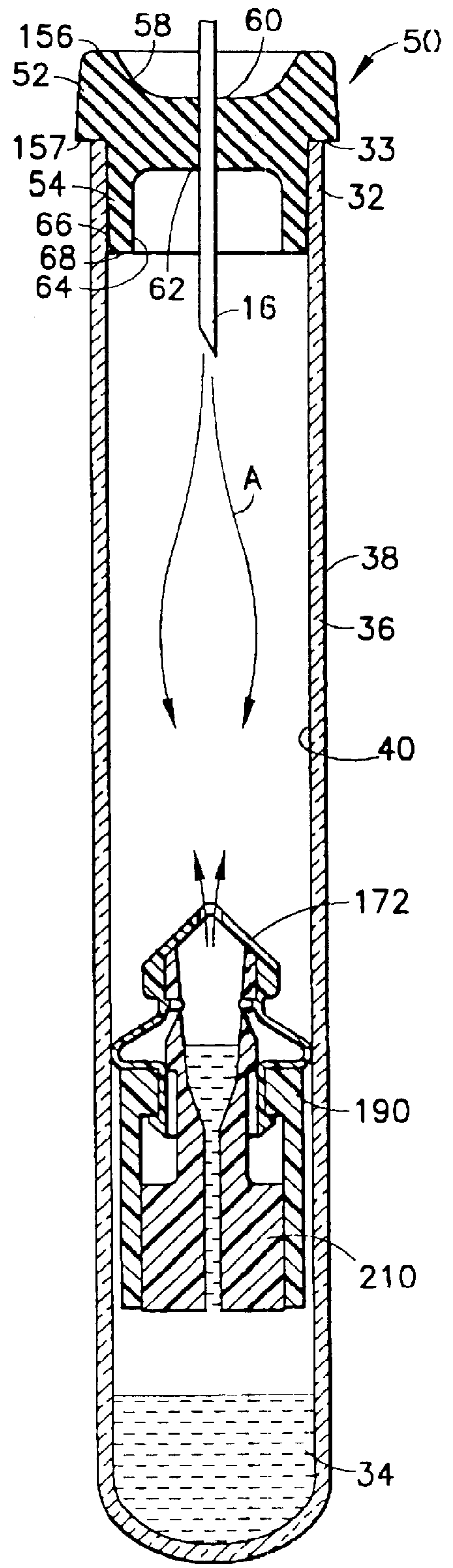
FIG. 7 is a longitudinal sectional view of the assembly of FIG. 6 taken along line 7—7 thereof illustrating fluid delivery into the assembly by a needle.

As shown in FIG. 7, the separator 170 is initially placed atop the testing reagents 44. A liquid sample A is delivered to the tube by a needle 16 that penetrates closure 50 in upper well area 60 and conical top wall 199 of bellow member 172. For purposes of illustration only, the liquid sample is blood. The liquid sample is delivered into the evacuated tube above the safety separator.

Figure 8:
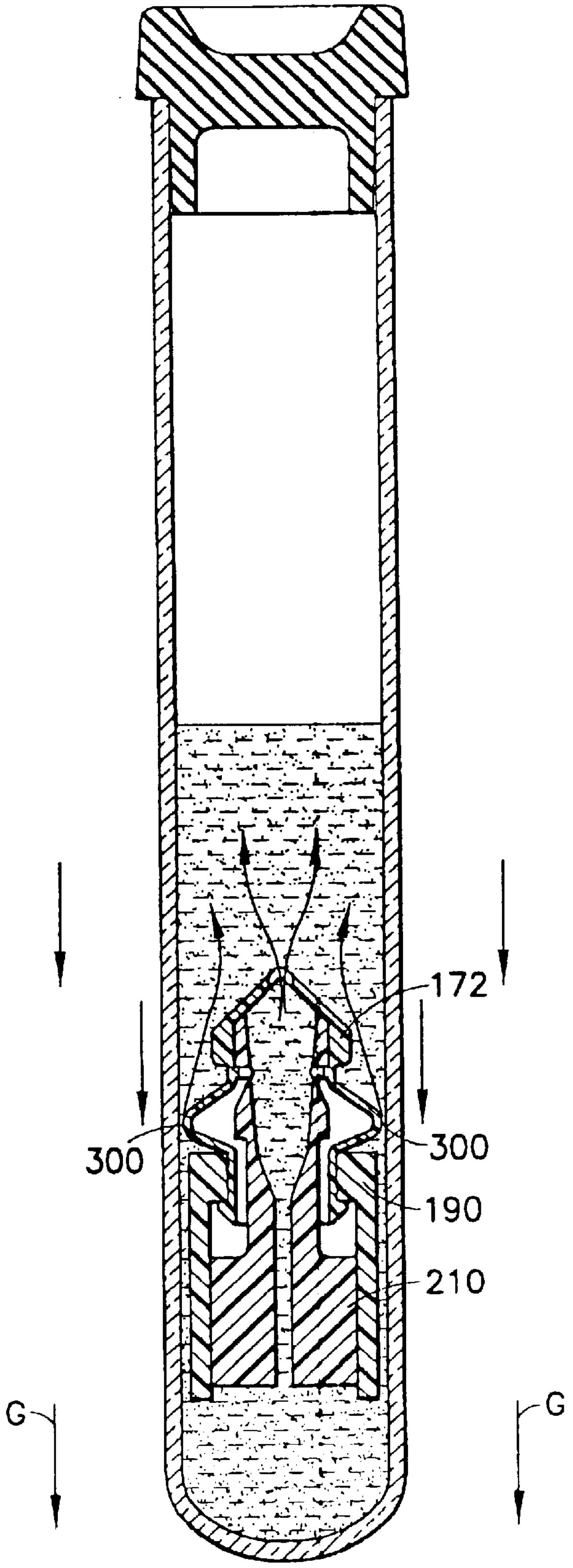
FIG. 8 illustrates that assembly under centrifugation and the movement of the separator and flow of testing reagents into the sample.
Figure 9:
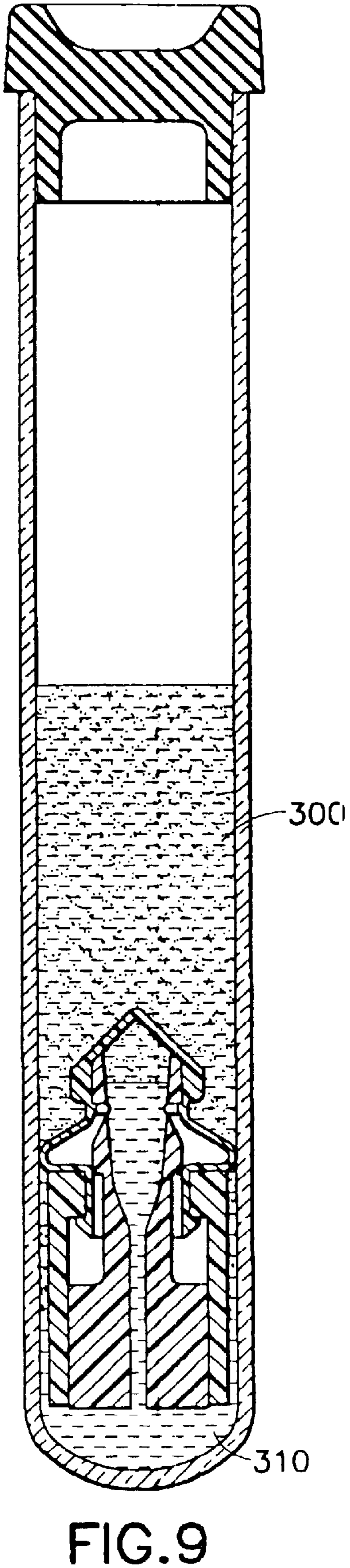
FIG. 9 illustrates the assembly after centrifugation and the preparation of the nucleic acid within the liquid sample.
Figure 10:
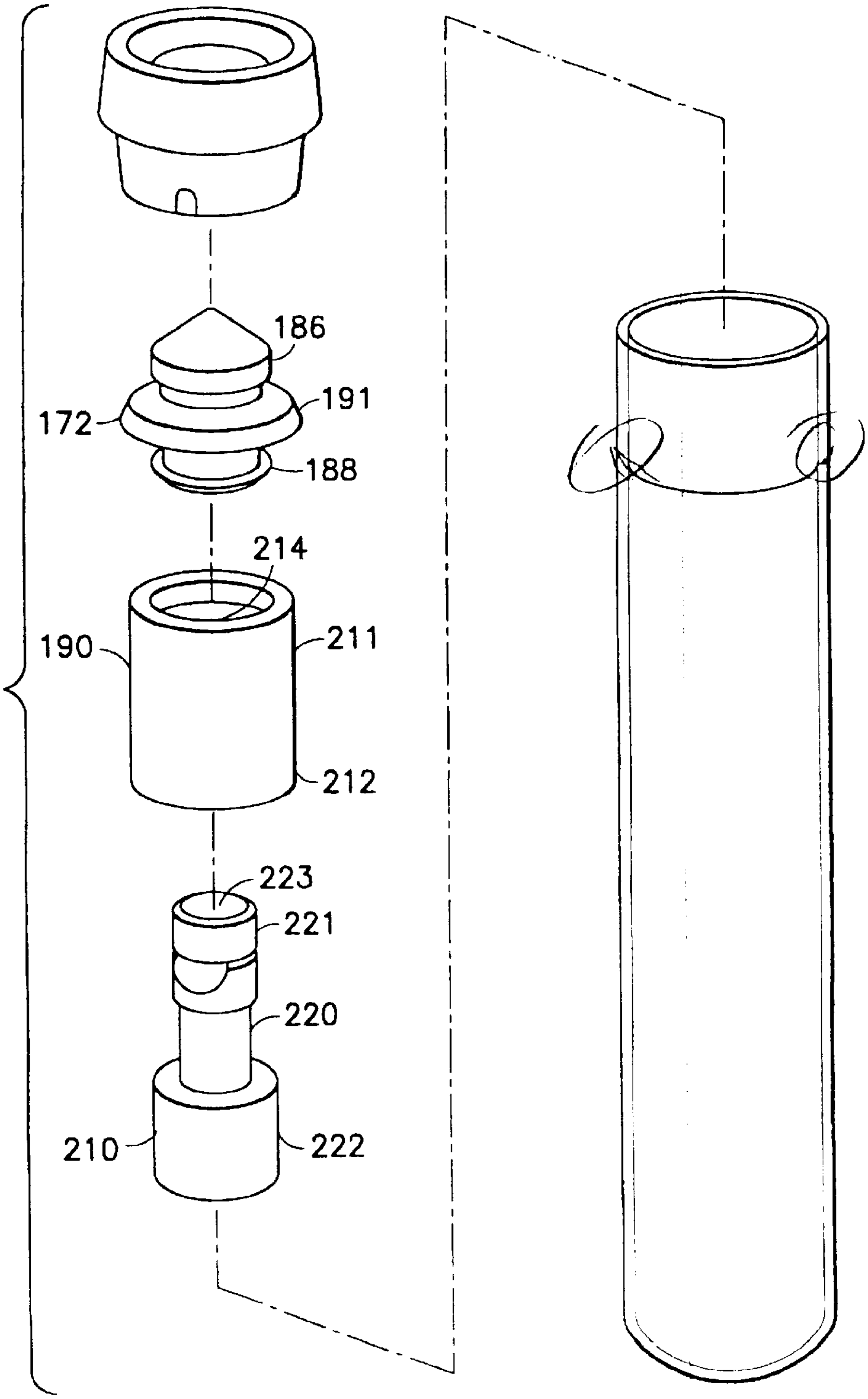
FIG. 10 is a perspective view of the unassembled elements of the assembly of the present invention.

As shown in FIGS. 8 and 9, assembly 120 is subjected to centrifugation or axial centrifugation force.

Seal body 191 of the separator deflects reducing its diameter and eliminating its interference fit with the inner wall of the tube. This opens up a path 300 between the tube and the separator, permitting the flow of the test reagents past the separator as the separator migrates down the tube. As the separator descends, the test reagents move upwardly past the separator. Air trapped in the central passageway 223 creates a buoyancy that could prevent further sinking of the separator into the fluid, but venting of air permits further movement of the separator into the fluid.

Following immersion of the separator 170 in the fluid sample, the buoyancy member 190 provides a buoyant upward force on the separator due to the displaced fluid. Simultaneously, the ballast member 210 provides an axial force downward on the separator. The combined forces stretch the bellow member 172 axially and pulls it out of contact with the inner wall of the tube so that it is free to move axially without any frictional drag.

After centrifugation is terminated, the absence of the centrifugal load will cause the seal body 191 to resiliently return toward an undeformed condition and tightly seal with the inner wall of the tube as shown in FIG. 9 creating a barrier between nucleic acid components 300 and the remainder of the sample fluid and test reagents 310.

In certain applications, the separators of the present invention may be used to trap extracted sediment from the sample plus test reagents. The extracted sediment is trapped below the separator, in the closed end of the tube. If desired, a double ended sample tube may be used, and the extracted sediment removed from the “closed” second end of the tube.

With the assembly of the present invention, testing solutions may be preloaded into the sample collection container and an inert barrier added atop the solution to reduce the possibility of back flow. Preloading the testing solutions advances the amount of target that can be recovered, as personnel untrained in sample preparation can collect samples and centrifuge immediately, yielding more non-degraded samples. Lastly, because the safety separator is not intended to come to rest between two solutions of different specific gravity, the manufacturing tolerances of the safety separator are greater.

The assembly of the present invention is advantageous over existing separation products that use gel. In particular the assembly of the present invention will not interfere with analytes as compared to gels that may interfere with analytes. Another attribute of the present invention will not interfere with therapeutic drug monitoring analytes.

Additionally, the assembly of the present invention does not require any additional steps or treatment by a medical practitioner; and the blood or fluid sample can be drawn in the standard fashion, using standard sampling equipment.

The present invention may be embodied in other specific forms and is not limited to any specific embodiments described in detail, which are merely exemplary. Various other modifications will be apparent to and readily made by those skilled in the art without departing from the scope and spirit of the invention. The scope of the invention will be measured by the appended claims and their equivalents.

What is claimed is:

1. A closed system for collection and testing of a sample, comprising an assembly, comprising:

a container having an open end, a closed end, a side wall extending therebetween and an inner surface of the side wall;

a resealable container closure;

test reagent preloaded in the container wherein the test reagent is a buffered lysing solution for preparing and stablizing nucleic acid; and a deformable inert barrier in physical contact with the inner surface, between the reagent and the closure, and spaced from the closure to define a sample collection portion of the container therebetween; the inert barrier separating the reagent from with the sample collection portion, for safe sample collection, said barrier being deformable under centrifugal forces to permit passage of test reagent into the sample collection portion so as to mix the sample and the preloaded test reagent.

2. The system of claim 1, wherein the inert barrier is a toroidal separator.

3. The system of claim 2, wherein the toroidal separator comprises an elastic toroid having a first open end, a second open end, and a seal body extending between the ends; foam securely mounted to the open first end; and a sinker securely mounted to the open second end.

4. The system of claim 1, wherein the inert barrier is a ballast separator.

5. The system of claim 4, wherein the ballast separator comprises:

a bellow member; and a ballast member; and a buoyancy member.

6. A safety separator for use with an evacuated tube samping device comprising: a container having an open end, a closed end, a side wall extending therebetween and an inner surface of the side wall;

a resealable closure to close the open end;

an evacuated sample collection portion beneath said closure for collecting the sample to be tested and preloaded with testing reagents, wherein the reagents are a buffered lysing solution for preparing and stabilizing nucleic acid;

a deformable seal body in sealing engagement with an inner surface of the device, to create a temporary barrier between the reagents and the evacuated sample collection portion; and said separator being deformable during centrifugation and having a density greater than the testing reagents, to cause said separator to sink through said testing reagents during centrifugation and release the testing reagents upward to mix with a sample in the evacuated collection portion of the device.

7. The separator of claim 6, further comprising an elastic toroid deformable under centrifugal forces, to define a fluid path between the toroid and the inner surface of the tube.

8. The separator of claim 6, further comprising a bellow member deformable under centrifugal forces to open a fluid path between the bellow member and the inner surface of the tube.

9. A method for collection of fluid samples comprising:

providing a sample collection tube having an open end, a closed end, and a sidewall extending therebetween defining a space, said side wall having an inner surface and an outer surface;

pre-loading the tube with testing reagent, wherein the test reagent is a buffered lysing solution for preparing and stabilizing nucleic acid;

providing a safety separator having a seal body for sealing engagement with the inner surface of the tube, said separator having a density greater than the testing reagent and spaced from the open end to define a sample collection portion of the container that is seperated from the reagents by the separator, and being deformable under centrifugal force;

inserting a resealable closure into the open end of the tube;

adding a fluid sample through the resealable closure; and centrifuging the tube, to deform the seal body, move the separator down toward the closed end, so as to mix the sample and the testing reagent.

10. The method of claim 9, wherein said sample collection tube is an evacuated tube and wherein said adding step further includes:

inserting a needle through said releasable closure; and introducing said fluid sample into said evacuated tube through said needle.

11. The method of claim 10, wherein said sample is a blood sample.

12. The method of claim 11, wherein said introducing step includes:

effecting venipuncture of a patient so as to draw said blood sample into said tube.

13. A sample collection tube, comprising:

a tube having an open end and a closed end, and a side wall extending therebetween, said sidewall having an inner surface and an outer surface;

an amount of testing reagent in the closed end of the tube, wherein the test reagent is a buffered lysing solution for preparing and stabilizing nucleic acid, a safety separator having a seal body making sealing engagement with the inner surface of the tube, said separator being denser than the testing reagent and spaced from the open end to define a sample collection portion of the container that is separated from the reagents by the separator, and being deformable under centrifugal force, and a removable closure, sealing the open end of the tube.

14. The tube of claim 13, wherein said sample includes nucleic acid components.

15. The tube of claim 14, wherein said safety separator includes an elastic toroid deformable under centrifugal forces, to define a fluid path between the toroid and the inner surface of the tube.

16. The tube of claim 13, wherein said safety separator includes a bellow member deformable under centrifugal forces to open a fluid path between the bellow member and the inner surface of the tube.

* * * * *